US012812053B2

(12) United States Patent
Yun et al.

(10) Patent No.: US 12,812,053 B2
(45) Date of Patent: Nov. 24, 2026

(54) CONTROL OPERATION OF IMAGE FORMING APPARATUS ACCORDING TO SETTING INFORMATION OF MULTI FEED DETECTION SENSOR

(71) Applicant: Hewlett-Packard Development Company, L.P., Spring, TX (US)

(72) Inventors: Changjung Yun, Seongnam Si (KR); Jaein Lee, Seongnam Si (KR); Jongtae Jeong, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 296 days.

(21) Appl. No.: 18/697,234

(22) PCT Filed: Mar. 10, 2022

(86) PCT No.: PCT/US2022/019696
§ 371 (c)(1),
(2) Date: Mar. 29, 2024

(87) PCT Pub. No.: WO2023/055421
PCT Pub. Date: Apr. 6, 2023

(65) Prior Publication Data

US 2024/0406324 A1 Dec. 5, 2024

(30) Foreign Application Priority Data

Oct. 1, 2021 (KR) ........................ 10-2021-0130982

(51) Int. Cl.
*H04N 1/00* (2006.01)

(52) U.S. Cl.
CPC ..... *H04N 1/00729* (2013.01); *H04N 1/00716* (2013.01); *H04N 1/00917* (2013.01)

(58) Field of Classification Search
CPC ........... H04N 1/00729; H04N 1/00716; H04N 1/00917; H04N 1/00411; H04N 1/00771; H04N 1/00806; H04N 1/00824; H04N 1/3263; H04N 1/00588; H04N 1/00774; H04N 1/0066; H04N 1/00822; H04N 2201/0081
See application file for complete search history.

(56) References Cited

U.S. PATENT DOCUMENTS

| | | | | |
|---|---|---|---|---|
| 10,015,338 | B2 * | 7/2018 | Koyanagi .......... | H04N 1/00745 |
| 2007/0138738 | A1 | 6/2007 | Motohashi et al. | |
| 2015/0373209 | A1 | 12/2015 | Aizono | |
| 2017/0214812 | A1 * | 7/2017 | Tomishima ........ | H04N 1/00716 |
| 2018/0160008 | A1 | 6/2018 | Osada et al. | |
| 2022/0030334 | A1 * | 1/2022 | Stamatakis ........... | H04W 84/18 |

* cited by examiner

*Primary Examiner* — Qian Yang
(74) *Attorney, Agent, or Firm* — Law Offices of Michael Dryja; Michael Dryja

(57) ABSTRACT

An example image forming apparatus includes a scanner including a feeding device, a multi-feed detection sensor to detect an event corresponding to a multi-feed of a paper fed from the feeding device, a return device to return a target paper detected as the event, a user interface device, a processor, and a memory to store instructions executable by the processor. The processor is to execute the instructions to control an operation of the return device based on the setting information of the multi-feed detection sensor input through the user interface device.

14 Claims, 14 Drawing Sheets

CONTROL OPERATION OF IMAGE FORMING APPARATUS ACCORDING TO SETTING INFORMATION OF MULTI FEED DETECTION SENSOR

BACKGROUND

An image forming apparatus may receive a request to perform a scan job with respect to a document. In that case, the image forming apparatus may obtain a digital image of the document through a scanner. Also, in a situation in which document papers are not fed one by one and two or more papers are fed to a feeding device inside the image forming apparatus at one time, a paper jam occurs. In this case, a user may remove the two or more papers fed to the feeding device and request to perform the scan job again.

BRIEF DESCRIPTION OF THE DRAWINGS

Various examples will be described below by referring to the following figures.

DETAILED DESCRIPTION

Hereinafter, examples of the disclosure will be described with reference to the accompanying drawings. However, the disclosure may be implemented in various different forms and is not limited to the examples described herein.

An "image forming apparatus" may refer to any type of apparatus capable of performing an image forming operation, such as a printer, a copier, a scanner, a fax machine, a multi-function printer (MFP), or a display apparatus. Also, the image forming apparatus may be a two-dimensional (2D) image forming apparatus or a three-dimensional (3D) image forming apparatus. An "image forming operation performed by the image forming apparatus" may refer to an operation related to printing, copying, scanning, faxing, storage, transmission, coating, etc., and may be a combination of at least two of the operations.

A "feeding device" may refer to a device that feeds printing medium (e.g., papers) of a document in response to a request to perform a scan job or a copy job. The feeding device may feed papers loaded thereon one by one. The feeding device may be referred to as a document feeder, a document feeding device, an automatic document feeder (ADF), and the like.

A "multi-feed detection sensor" may detect an event corresponding to a multi-feed of paper fed from the feeding device. A "return device" may return a target paper detected as an event corresponding to the multi-feed. Based on the target paper being returned, the feeding device may feed a paper.

The "multi-feed" may refer to a situation in which two or more papers are fed at a time from the feeding device. For example, the "event corresponding to the multi-feed" may include at least one of an event in which multiple papers are fed at one time, an event in which a paper to which a memo is attached is fed, an event in which a stapled paper is fed, an event in which a paper having a thickness exceeding a preset reference value is fed, and the like.

For example, since the event corresponding to the multi-feed may include an event inappropriate to be detected as the multi-feed, the image forming apparatus may set setting information of a multi-feed detection sensor based on input information of the user, thereby reducing or preventing additional or subsidiary operations of the user and preventing a scan job from being delayed.

Figure 1:
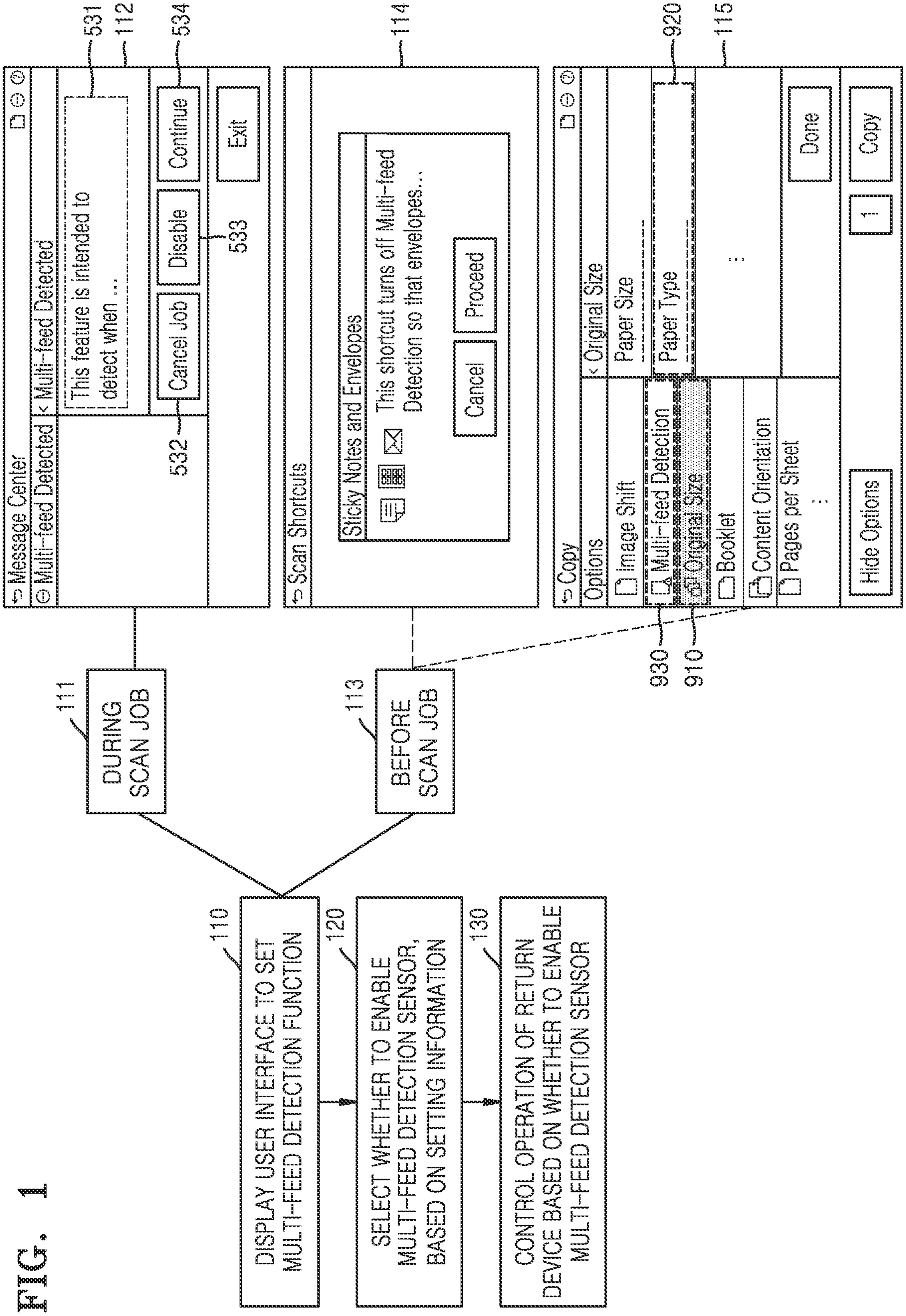
FIG. 1 is a conceptual diagram illustrating an operating method of an image forming apparatus to control operations of a multi-feed detection sensor and a return device according to an example.

FIG. 1 is a conceptual diagram illustrating an operating method of an image forming apparatus to control operations of a multi-feed detection sensor and a return device according to an example.

Referring to FIG. 1, an image forming apparatus may display a user interface to set a multi-feed detection function in operation 110. For example, the user interface to set the multi-feed detection function may be displayed as an event corresponding to a multi-feed being detected during a scan job and may be displayed before the scan job.

For example, the image forming apparatus may perform a scan job according to a request for the scan job in operation 111. Based on the event corresponding to the multi-feed being detected, the image forming apparatus may display a first user interface to set the multi-feed detection function.

For example, referring to an image 112 of FIG. 1, the image forming apparatus may display a description of the multi-feed and a message 531 to guide disabling of the multi-feed detection function based on, for example, a paper being a thick paper, a paper having a sticky note attached thereto, etc. Also, the image forming apparatus may display an icon 532 to cancel the scan job, an icon 533 to disable the multi-feed detection function, and an icon 534 to enable the multi-feed detection function.

For example, the image forming apparatus may display a user interface to set the multi-feed detection function before the scan job in operation 113.

In an example, the image forming apparatus may display a shortcut for setting the multi-feed detection function. For example, based on an input for selecting the shortcut being received, the image forming apparatus may display a screen to set the multi-feed detection function as shown in an image 114 of FIG. 1.

For example, the image forming apparatus may provide a menu 910 to set the original paper size. Based on the menu 910 to set the original paper size being selected, the image forming apparatus may provide the menu 910 to set the original paper size and a menu 920 to set the original paper type as shown in an image 115 of FIG. 1.

In operation 120, the image forming apparatus may select whether to enable the multi-feed detection sensor, based on the setting information.

For example, as illustrated in the image 112 of FIG. 1, based on an input for selecting the icon 533 to disable the multi-feed detection function being received, the image forming apparatus may disable the multi-feed detection sensor and control the operation of the return device so that a target paper detected as the event corresponding to the multi-feed is not returned. In addition, based on an input for selecting the icon 534 to enable the multi-feed detection function being received, the image forming apparatus may enable the multi-feed detection sensor. The image forming apparatus may control the operation of the return device so that the target paper detected as the event corresponding to the multi-feed is returned.

For example, as illustrated in the image 114 of FIG. 1, based on an input for selecting a “proceed” icon being received, the image forming apparatus may disable the multi-feed detection sensor. Also, based on an input for selecting a “cancel” icon being received, the image forming apparatus may enable the multi-feed detection sensor. For example, the setting information input through the user interface shown in the image 114 may be temporarily applied to an input job.

For example, as illustrated in the image 115 of FIG. 1, based on the set original paper type being a paper detected as the event corresponding to the multi-feed, the image forming apparatus may set the multi-feed detection function to an off state in a menu 930 to set the multi-feed detection function. That is, the image forming apparatus may disable the multi-feed detection sensor. Also, based on the set original paper type being a plain paper, the image forming apparatus may set the multi-feed detection function to an on state in the menu 930 to set the multi-feed detection function. That is, the image forming apparatus may enable the multi-feed detection sensor.

In operation 130, the image forming apparatus may control the operation of the return device based on the selection of whether to enable the multi-feed detection sensor. For example, based on the event corresponding to the multi-feed being detected while the multi-feed detection sensor is enabled, the image forming apparatus may return the target paper detected as the event by controlling the operation of the return device. For example, while the multi-feed detection sensor is disabled, the image forming apparatus may perform the scan job without returning the target paper detected as the event corresponding to the multi-feed.

Figure 2:
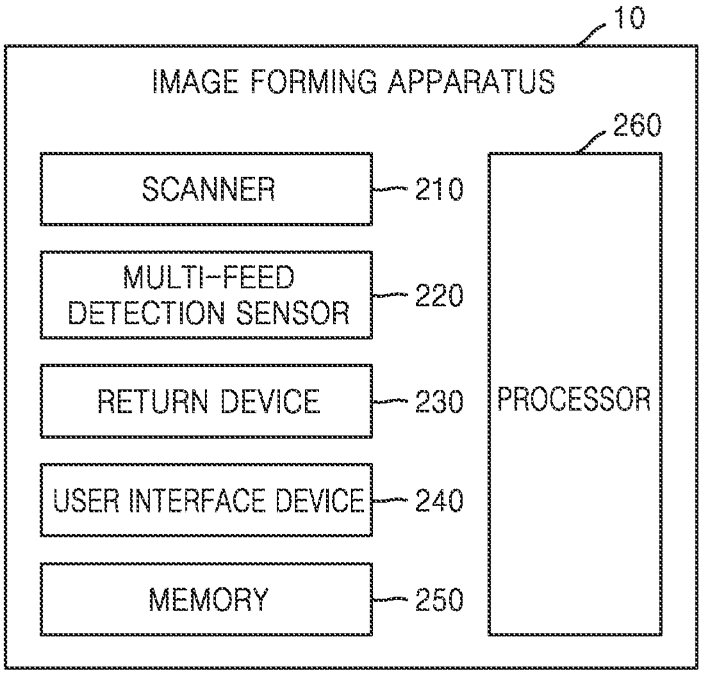
FIG. 2 is a block diagram of an image forming apparatus according to an example.

FIG. 2 is a block diagram of an image forming apparatus according to an example.

Referring to FIG. 2, an image forming apparatus 10 may include a scanner 210, a multi-feed detection sensor 220, a return device 230, a user interface device 240, a memory 250, and a processor 260. However, the image forming apparatus 10 may be implemented by more or fewer elements than the elements illustrated in FIG. 2. Hereinafter, examples of the elements will be described.

The scanner 210 may perform a scan job in response to a request for the scan job within the image forming apparatus 10 to generate an image. For example, the scanner 210 may include a feeding device to feed papers of a document on which the scan job is to be performed. For example, the feeding device may feed the papers loaded on the feeding device one by one according to the request for the scan job.

The multi-feed detection sensor 220 may detect an event corresponding to a multi-feed of the paper fed from the feeding device. For example, the multi-feed detection sensor 220 may detect a thickness of the paper fed from the feeding device. Based on the thickness of the paper exceeding a preset reference value, the multi-feed detection sensor 220 may detect the event corresponding to the multi-feed. The return device 230 may return a target paper detected as the event corresponding to the multi-feed. For example, the return device 230 may move the target paper in a direction opposite to a feeding direction, and the feeding device may feed the target paper again. For example, a return operation of returning the paper and a retry operation of separating and feeding the returned paper from the feeding device again, which may be performed by the return device 230, may be referred to as reverse and retry. As the event corresponding to the multi-feed is detected, the image forming apparatus 10 may perform reverse and retry for a preset number of times.

For example, even though reverse and retry is performed for the preset number of times, based on the event corresponding to the multi-feed being detected, the user interface device 240 may display guide information for guiding an action with respect to the multi-feed.

For example, the event corresponding to the multi-feed may include at least one of an event in which multiple papers are fed at one time, an event in which a paper having a sticky note thereon is fed, an event in which a stapled paper is fed, an event in which the paper having the thickness exceeding the preset reference value is fed, etc.

For example, the event corresponding to the multi-feed may be detected based on the performance of reverse and retry exceeding the preset number of times.

For example, during the scan job, based on multiple papers being fed at one time, since an image scanned for each of the multiple papers is not generated, the scan job may not be normally completed. Accordingly, the return device 230 may move the multiple papers in the direction opposite to the feeding direction, and the feeding device may feed each of the multiple papers again.

For example, the paper having the sticky note thereon, the stapled paper, the paper having the thickness exceeding the preset reference value, etc. may be detected as the event corresponding to the multi-feed based on the thickness of the paper exceeding the preset reference value. Therefore, the paper having the sticky note thereon, the stapled paper, the paper having the thickness exceeding the preset reference value, etc. may be unsuitable as the event corresponding to the multi-feed. That is, the paper having the sticky note thereon, the stapled paper, the paper having the thickness exceeding the preset reference value, etc. may be papers that do not require detection of the multi-feed. For example, based on a paper being unsuitably detected as the event corresponding to the multi-feed, in order to minimize an unnecessary action of a user, the user interface device 240 may provide a user interface to set a multi-feed detection function. In addition, in order to prevent a paper from being unsuitably detected as the event corresponding to the multi-feed, the user interface device 240 may provide the user interface to set the multi-feed detection function.

The user interface device 240 may include an input portion to receive an input for controlling an operation of the image forming apparatus 10 from the user, and an output portion to display information such as a result according to the operation of the image forming apparatus 10, a state of the image forming apparatus 10, etc. For example, the user interface device 240 may include a manipulation panel to receive a user input, a display panel to display a screen, etc.

As an example, the input portion may include a device capable of receiving various types of user input, such as a keyboard, a physical button, a touch screen, a camera, a microphone, and the like. In addition, the output portion may include, for example, a display panel, a speaker, and the like. However, the disclosure is not limited thereto, and the user interface device 240 may include a device supporting various input/output.

The memory 250 may store machine readable instructions or a program. For example, the memory 250 may store instructions for an example operating method of the image forming apparatus 10 that controls an operation of the return device 230 based on setting information of the multi-feed detection sensor 220.

The memory 250 may include at least one type of storage medium from among a flash-memory-type memory, a hard-disk-type memory, a multimedia-card-micro-type memory, a card-type memory (e.g., a secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, an optical disk, and the like.

The processor 260 may control an operation of the image forming apparatus 10 and include at least one processor such as a central processing unit (CPU). The processor 260 may include at least one processor specialized for each function or may be an integrated processor.

The processor 260 may execute a program stored in the memory 250, read data or files stored in the memory 250, or store new data or files in the memory 250. The processor 260 may, by executing the instructions stored in the memory 250, perform an operation of receiving setting information of the multi-feed detection sensor 220 that detects the event corresponding to the multi-feed of the paper fed from the feeding device of the scanner 210, based on the setting information, setting whether to enable the multi-feed detection sensor 220, and, based on whether to enable the multi-feed detection sensor 220, controlling the operation of the return device 230 that returns the target paper detected as the event.

For example, the processor 260 may receive the setting information of the multi-feed detection sensor 220 through the user interface device 240. For example, based on the event corresponding to the multi-feed being detected by the multi-feed detection sensor 220 according to the scan job, the user interface device 240 may display the user interface to set the multi-feed detection function. For example, before the scan job, the user interface device 240 may display the user interface to set the multi-feed detection function based on a user input.

For example, based on the scan job being performed with the paper having the sticky note thereon, the stapled paper, etc., in which thicknesses of the papers exceed the preset reference value, although no paper jam occurs, the event corresponding to the multi-feed may be detected by the multi-feed detection sensor 220. In this case, in order to avoid delaying the scan job, the user may select a setting to disable the multi-feed detection function.

The processor 260 may set whether to enable the multi-feed detection sensor 220 based on the setting information. For example, based on the setting information including information to enable the multi-feed detection function, the processor 260 may enable the multi-feed detection sensor 220. On the other hand, based on the setting information including information to disable the multi-feed detection function, the processor 260 may disable the multi-feed detection sensor 220.

The processor 260 may control the operation of the return device 230 to return the target paper detected as the event, based on whether to enable the multi-feed detection sensor 220.

For example, based on the state of the multi-feed detection sensor 220 being an enabled state, the multi-feed detection sensor 220 may detect the event corresponding to the multi-feed. Based on the event corresponding to the multi-feed being detected, the processor 260 may control the operation of the return device 230 so that the target paper detected as the event is returned.

For example, based on the state of the multi-feed detection sensor 220 being a disabled state, the paper to be detected as the event corresponding to the multi-feed may not be detected as the target paper. The processor 260 may complete the scan job according to the request for the scan job.

In an example, based on the state of the multi-feed detection sensor 220 being the enabled state, the multi-feed detection sensor 220 may detect the event corresponding to the multi-feed of the paper according to the scan job. The user interface device 240 may display a first user interface to set the multi-feed detection function. For example, the first user interface may include an icon to select whether to enable or disable the multi-feed detection function.

The processor 260 may confirm whether first setting information includes information to enable the multi-feed detection function. For example, based on the first setting information including the information to enable the multi-feed detection function, the processor 260 may enable the multi-feed detection sensor 220. Also, the user interface device 240 may display first guide information to prevent the multi-feed of the target paper.

For another example, based on the first setting information including the information to disable the multi-feed detection function, the processor 260 may disable the multi-feed detection sensor 220 and control the operation of the return device 230 so that the target paper is not returned. Also, the user interface device 240 may display second guide information to retry the scan job.

For example, the user interface device 240 may display a second user interface to set the multi-feed detection function to be enabled or disabled. For example, the second user interface may be provided as a shortcut.

For example, the second user interface may be provided as an icon to execute a screen for controlling the operation of the multi-feed detection sensor 220 on a main screen provided by the user interface device 240. Based on an input for selecting the icon being received, the user interface device 240 may display a screen for setting the multi-feed detection sensor 220 to be enabled or disabled.

For example, the second user interface may be provided as an icon selectable in two modes of an on state or an off state of the multi-feed detection function. For example, based on the icon being in the on state, the multi-feed detection sensor 220 may be enabled. Based on the icon being in the off state, the multi-feed detection sensor 220 may be disabled.

The user interface device 240 may receive second setting information through the second user interface. For example, the user interface device 240 may receive, through the second user interface, the second setting information to set the multi-feed detection function to be enabled or disabled.

The processor 260 may control the operation of the multi-feed detection sensor 220 with respect to an input job based on the second setting information. For example, a function of the multi-feed detection sensor 220 set according to the second setting information may be applied to the input job, and as the input job is completed, set to a previous state. For example, the previous state of the multi-feed detection sensor 220 may be the state of the multi-feed detection sensor 220 before the second setting information is input. That is, the second setting information may be temporarily applied to a setting of the multi-feed detection function.

For example, based on the second setting information including information to enable the multi-feed detection function, the multi-feed detection sensor 220 may be enabled. For example, based on the scan job being performed by the scanner 210, the multi-feed detection sensor 220 may monitor whether the event corresponding to the multi-feed of the paper fed from the feeding device occurs. Based on the event corresponding to the multi-feed of the paper being detected, the return device 230 may return the target paper detected as the event. Based on the scan job being completed, the multi-feed detection sensor 220 may be set to the previous state.

For example, before the second setting information is input, the multi-feed detection function may be in an enabled state. Based on the second setting information including information to disable the multi-feed detection function, the multi-feed detection sensor 220 may be disabled. For example, based on the scan job being performed by the scanner 210, the multi-feed detection sensor 220 may be disabled, and a return function of the return device 230 to return the target paper may also be disabled. Accordingly, the event corresponding to the multi-feed is not detected, and the scan job may be completed. After the scan job is completed, the multi-feed detection function may be enabled, and the return function of the return device 230 to return the target paper may also be enabled. Accordingly, based on the event corresponding to the multi-feed occurring after the scan job is completed, the return device 230 may return the target paper detected as the event.

For example, the processor 260 may receive, through the user interface device 240, an input for setting an original paper type with respect to a job that includes performing a scan. For example, the job that includes performing a scan may be the scan job, a scan-to-email job, a scan-to-share job, a scan-to-fax job, a copy job, etc. The job that includes performing a scan may refer to a case in which the scan job is included in the job.

For example, the original paper may refer to a paper that is the original for the job that includes performing a scan. In addition, the original paper may be distinguished from a copy paper output as the job that includes performing a scan. Also, setting for the original paper and setting for the copy paper may be set differently.

For example, the original paper type may be set to one of plain paper, thick paper, thin paper, label paper, envelope, thick envelope, cotton paper, card paper, stapled paper, etc.

The processor 260 may confirm whether the original paper type is a type in which the event corresponding to the multi-feed is detected.

For example, based on the original paper type being the type in which the event corresponding to the multi-feed is detected, the processor 260 may disable the multi-feed detection sensor 220. The processor 260 may perform the scan job without returning the target paper detectable as the event corresponding to the multi-feed.

For example, based on the original paper type not being the type in which the event corresponding to the multi-feed is detected, the processor 260 may enable the multi-feed detection sensor 220. Based on the event corresponding to the multi-feed being detected by the multi-feed detection sensor 220, the processor 260 may return the target paper detected as the event by controlling the operation of the return device 230.

Figure 3:
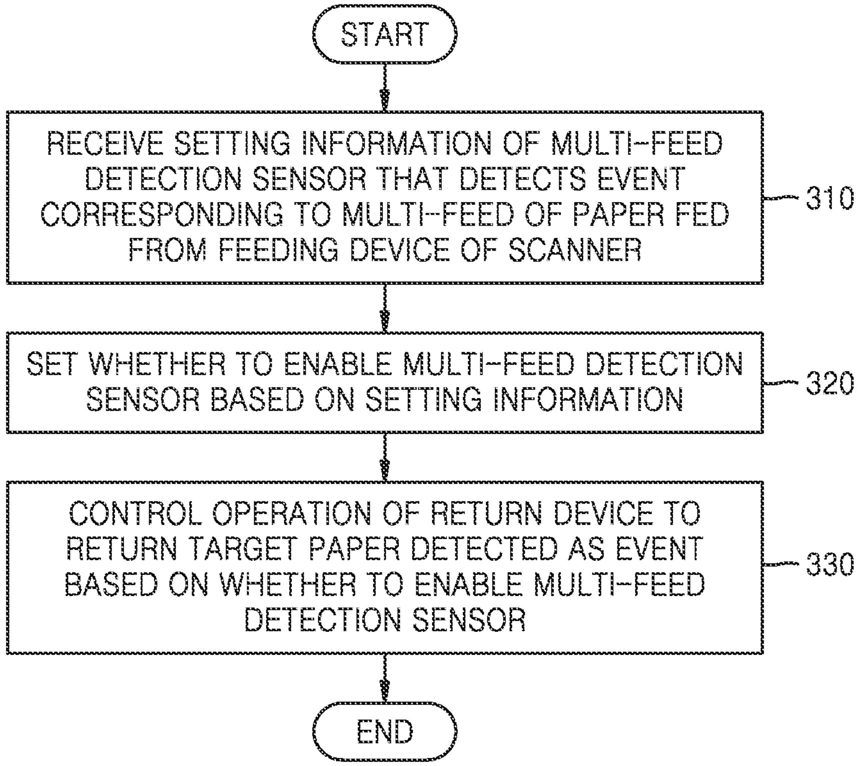
FIG. 3 is a conceptual diagram illustrating an operating method of an image forming apparatus to control operations of a multi-feed detection sensor and a return device based on setting information of the multi-feed detection sensor according to an example.

FIG. 3 is a conceptual diagram illustrating an operating method of an image forming apparatus to control operations of a multi-feed detection sensor and a return device based on setting information of the multi-feed detection sensor according to an example.

Referring to FIG. 3, the image forming apparatus 10 may receive setting information of the multi-feed detection sensor 220 in operation 310. For example, the multi-feed detection sensor 220 may detect an event corresponding to a multi-feed of a paper fed from a feeding device of the scanner 210.

In operation 320, the image forming apparatus 10 may set whether to enable the multi-feed detection sensor 220 based on the setting information.

For example, based on the setting information including information to enable a multi-feed detection function, the image forming apparatus 10 may enable the multi-feed detection sensor 220. On the other hand, based on the setting information including information to disable the multi-feed detection function, the image forming apparatus 10 may disable the multi-feed detection sensor 220.

In operation 330, the image forming apparatus 10 may control an operation of the return device 230 to return a target paper detected as the event based on whether to enable the multi-feed detection sensor 220.

For example, based on a state of the multi-feed detection sensor 220 being an enabled state, the multi-feed detection sensor 220 may detect the event corresponding to the multi-feed. Based on the event corresponding to the multi-feed being detected, the image forming apparatus 10 may control the operation of the return device 230 so that the target paper detected as the event is returned.

For example, based on the state of the multi-feed detection sensor 220 being a disabled state, a paper to be detected as the event corresponding to the multi-feed may not be detected as the target paper.

Figure 4:
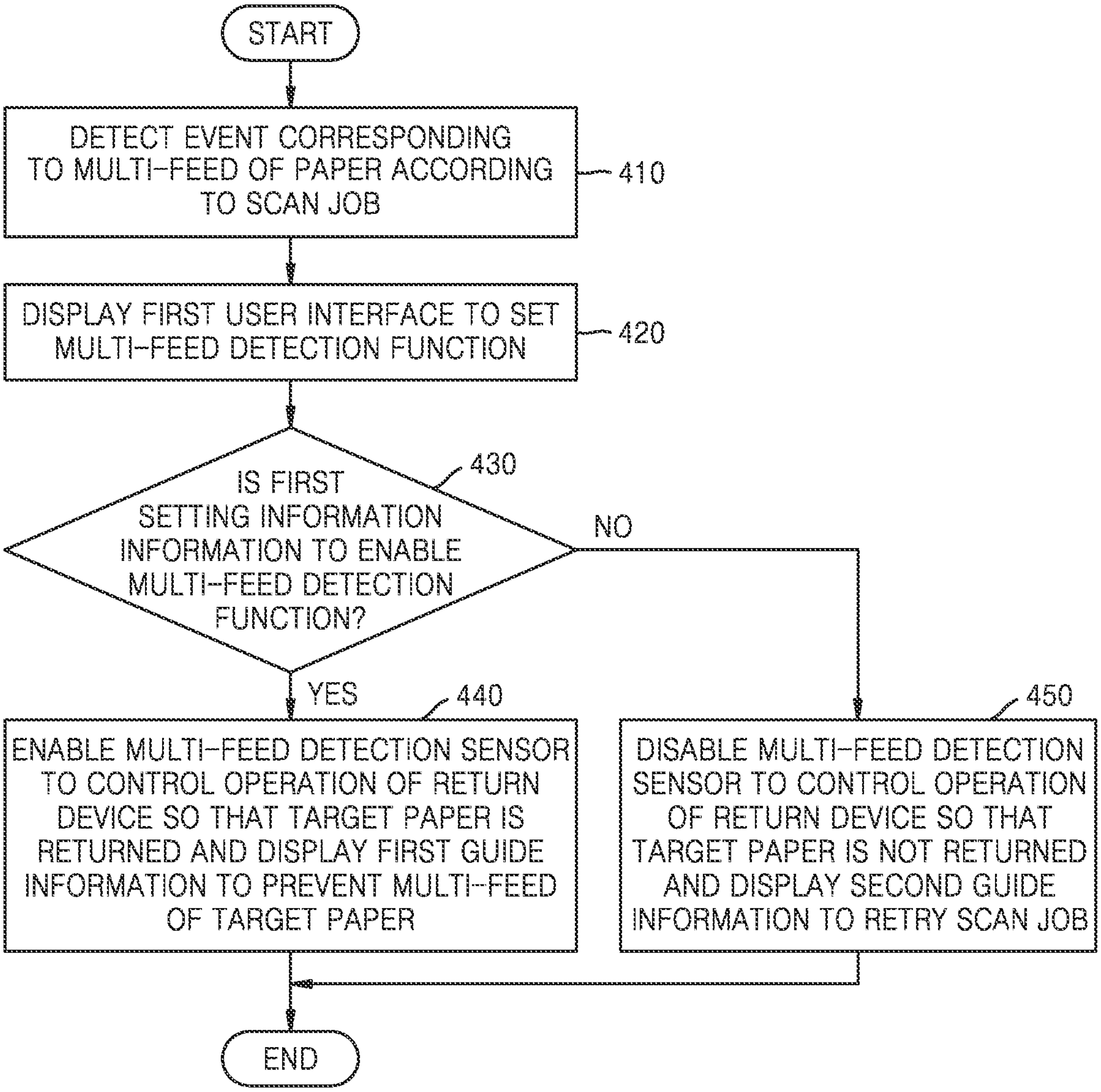
FIG. 4 is a flowchart illustrating an operating method of an image forming apparatus based on an event corresponding to a multi-feed of paper being detected according to a scan job according to an example.

FIG. 4 is a flowchart illustrating an operating method of an image forming apparatus based on an event corresponding to a multi-feed of a paper being detected according to a scan job according to an example.

Referring to FIG. 4, the image forming apparatus 10 may detect an event corresponding to a multi-feed of the paper according to the scan job in operation 410. For example, the multi-feed detection sensor 220 in the image forming apparatus 10 may detect the event corresponding to the multi-feed of the paper.

For example, the event corresponding to the multi-feed may include at least one of an event in which multiple papers are fed at one time, an event in which a paper having a sticky note thereon is fed, an event in which a stapled paper is fed, an event in which a paper having a thickness exceeding a preset reference value is fed, etc.

In operation 420, the image forming apparatus 10 may display a first user interface to set a multi-feed detection function. For example, the first user interface may include an icon to select whether to enable or disable the multi-feed detection function.

For example, based on the event being unsuitable to be detected as the event corresponding to the multi-feed, the image forming apparatus 10 may receive an input for disabling the multi-feed detection function through the first user interface. For example, the event unsuitable to be detected as the event corresponding to the multi-feed may be a case in which one paper is fed from a feeding device, but a thickness of the paper exceeds a preset reference value.

For example, based on the event being the event in which the multiple papers are fed at one time, the image forming apparatus 10 may receive an input for enabling the multi-feed detection function through the first user interface.

In operation 430, the image forming apparatus 10 may confirm whether first setting information includes information to enable the multi-feed detection function.

For example, based on the first setting information including the information to enable the multi-feed detection function, the image forming apparatus 10 may perform operation 440. For another example, based on the first setting information including the information to disable the multi-feed detection function, the image forming apparatus 10 may perform operation 450.

In operation 440, the image forming apparatus 10 may enable the multi-feed detection sensor 220. Also, the image forming apparatus 10 may display first guide information to prevent the multi-feed of a target paper.

For example, based on the event being the event in which the multiple papers are fed at one time, the image forming apparatus 10 may display the first guide information to guide loading the multiple papers back into the feeding device and pressing a scan button. For example, based on the event being the event in which the paper having the sticky note thereon is fed, the image forming apparatus 10 may display the first guide information to guide removing the note from the paper, loading the paper back into the feeding device, and pressing the scan button.

In operation 450, the image forming apparatus 10 may control an operation of the return device 230 so that the target paper is not returned by disabling the multi-feed detection sensor 220. Also, the image forming apparatus 10 may display second guide information to retry the scan job.

For example, based on the event being the event unsuitable to be detected as the event corresponding to the multi-feed, the image forming apparatus 10 may display the second guide information to guide loading the paper back into the feeding device and pressing the scan button.

FIGS. 5A to 5E are diagrams illustrating a user interface displayed based on an event corresponding to a multi-feed of a paper being detected according to a scan job according to an example.

For example, based on a state of the multi-feed detection sensor 220 in the image forming apparatus 10 being an enabled state, as the scan job is performed, the multi-feed detection sensor 220 may detect an event corresponding to the multi-feed of the paper fed from a feeding device.

For example, the event corresponding to the multi-feed may include at least one of an event in which multiple papers are fed at one time, an event in which a paper having a sticky note thereon is fed, an event in which a stapled paper is fed, an event in which a paper having a thickness exceeding a preset reference value is fed, and the like.

According to the scan job, based on the event corresponding to the multi-feed being detected by the multi-feed detection sensor 220, the image forming apparatus 10 may display notification information about the multi-feed through the user interface device 240.

Figure 5A:
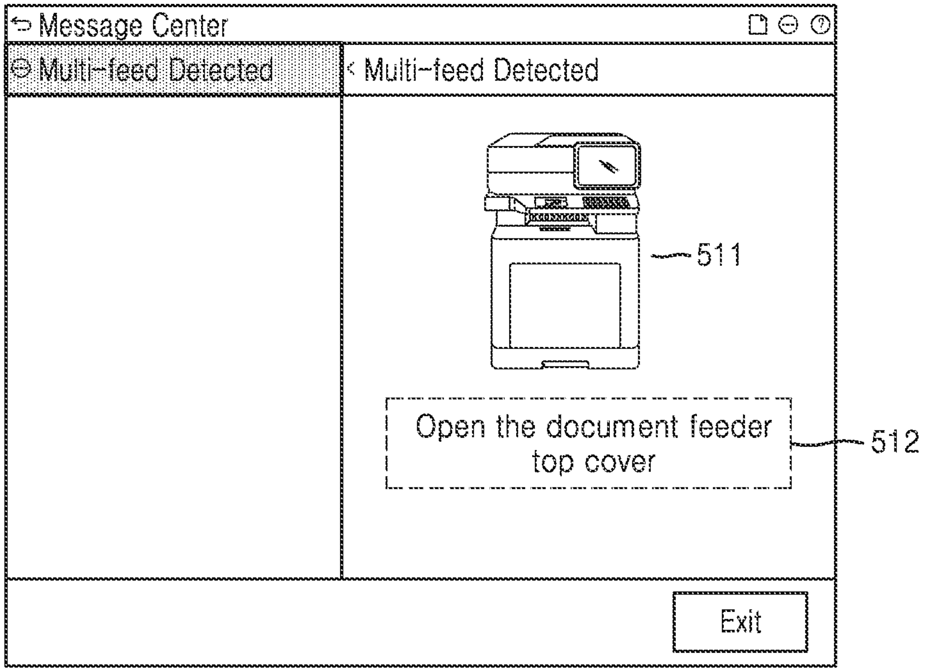
FIGS. 5A to 5E are diagrams illustrating a user interface displayed based on an event corresponding to a multi-feed of a paper being detected according to a scan job according to an example.

Referring to FIG. 5A, the user interface device 240 may display a message 512 such as “Open the document feeder top cover”. Also, the user interface device 240 may display an image 511 with respect to the message 512.

Figure 5B:
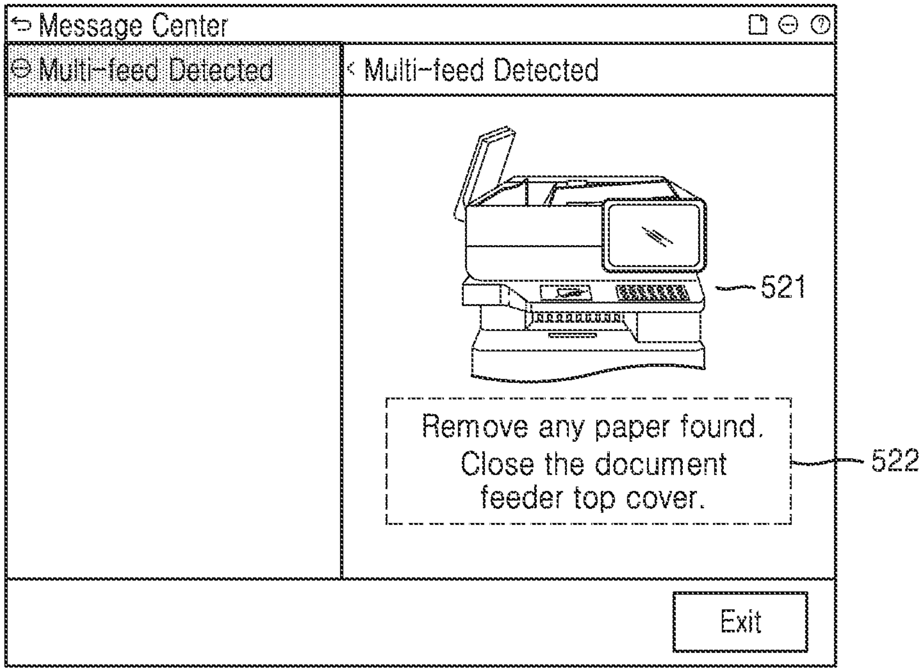

Referring to FIG. 5B, the user interface device 240 may display a guiding message 522 such as “Remove any paper found. Close the document feeder top cover”. Also, the user interface device 240 may display an image 521 with respect to the message 522.

Figure 5C:
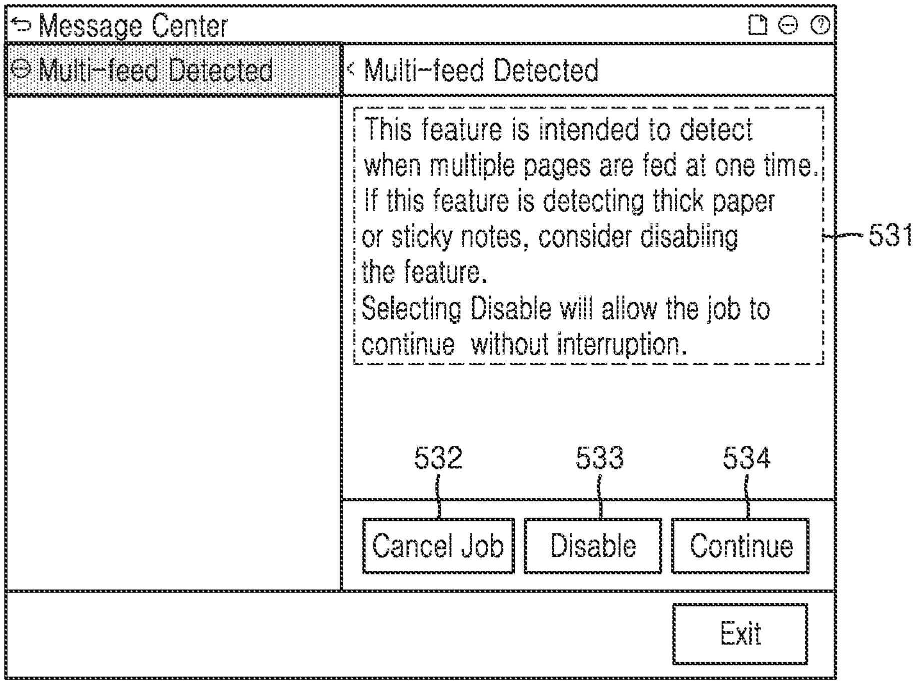

Referring to FIG. 5C, the user interface device 240 may display a description of the multi-feed and a message 531 guiding to disable a multi-feed detection function based on a paper being a thick paper, a paper having a sticky note thereon, etc.

In addition, the user interface device 240 may display the icon 532 to cancel the scan job, the icon 533 to disable the multi-feed detection function, and the icon 534 to enable the multi-feed detection function.

For example, based on the event corresponding to the multi-feed being one of the event in which the paper having the sticky note thereon is fed, the event in which the stapled paper is fed, and the event in which the paper having the thickness exceeding the preset reference value is fed, the scan job may need to continue without interruption. In this case, the user may select the icon 533 to disable the multi-feed detection function.

For example, based on the event corresponding to the multi-feed being one of the event in which multiple papers are fed at one time and an event in which a paper from which a sticky note needs to be removed is fed, the scan job may be interrupted, and each of the papers may need to be fed. In this case, the user may select the icon 534 to enable the multi-feed detection function.

For example, based on the user intending to cancel the scan job, the user may select the icon 532 to cancel the scan job.

As described with reference to FIG. 5C, based on the user selecting the icon 534 to enable the multi-feed detection function, the image forming apparatus 10 may enable the multi-feed detection sensor 220 and display first guide information to prevent the multi-feed.

Figure 5D:
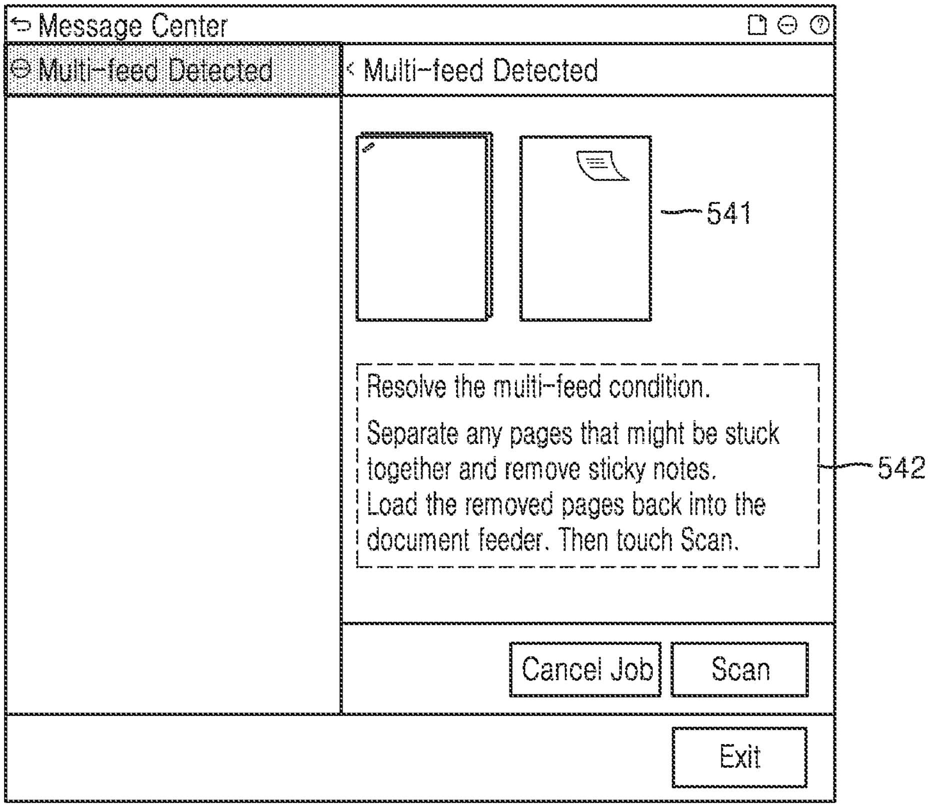

For example, as shown in FIG. 5D, the user interface device 240 may display the first guide information to prevent the multi-feed. For example, the first guide information may include information based on which the user is able to take action in order to remove a condition detected as the event corresponding to the multi-feed. For example, the first guide information may be displayed as a message or an image.

For example, based on the target paper detected as the event corresponding to the multi-feed being the paper having the sticky note thereon, the user interface device 240 may display a message 542 guiding to remove the note from the paper, load the paper into a document feeder, and press a scan button and an image 541 corresponding to the message 542. In this case, even though the user does not return to a home screen and input a setting to start the scan job, the user may take the action corresponding to the message 542 to continue the scan job and reduce a subsidiary operation for the scan job.

As described with reference to FIG. 5C, based on the user selecting the icon 533 to disable the multi-feed detection function, the image forming apparatus 10 may disable the multi-feed detection sensor 220 and control an operation of the return device 230 so that the target paper detected as the event corresponding to the multi-feed is not returned. Also, the image forming apparatus 10 may display second guide information to retry the scan job.

Figure 5E:
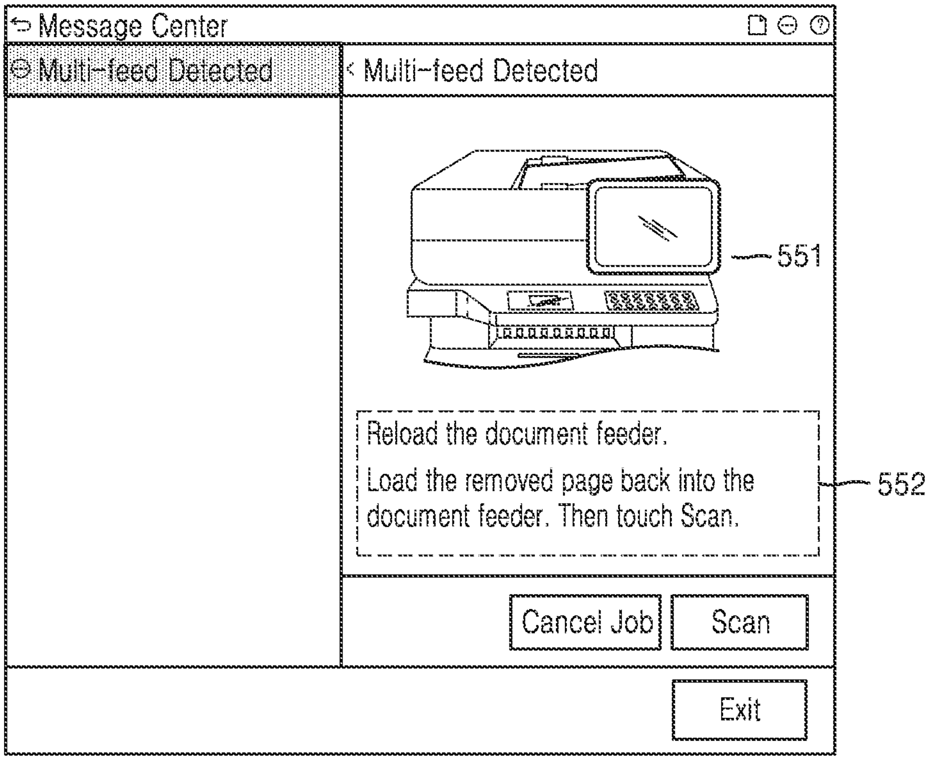

For example, as shown in FIG. 5E, the user interface device 240 may display the second guide information guiding to retry the scan job. For example, the second guide information may display a message 552 guiding to load the target paper detected as the event corresponding to the multi-feed into the document feeder and press the scan button, and an image 551 corresponding to the message 552. In this case, even though the user does not return to the home screen and input a setting for starting the scan job, the user may take the action corresponding to the message 552 to continue the scan job.

Figure 6:
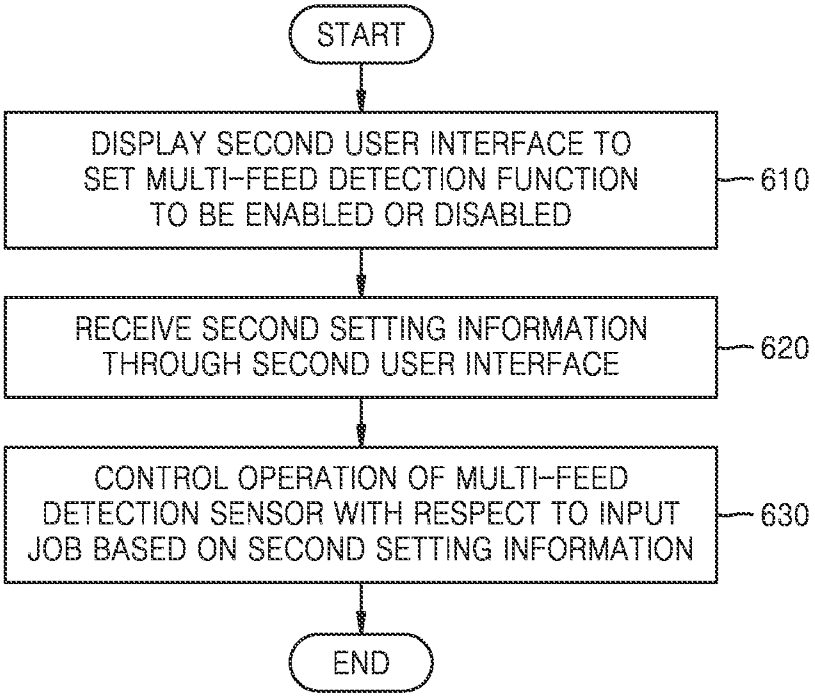
FIG. 6 is a flowchart illustrating an operating method of an image forming apparatus to control an operation of a multi-feed detection sensor according to setting information of a multi-feed detection function according to an example.

FIG. 6 is a flowchart illustrating an operating method of an image forming apparatus to control an operation of a multi-feed detection sensor according to setting information of a multi-feed detection function according to an example.

Referring to FIG. 6, the image forming apparatus 10 may display a second user interface to set the multi-feed detection function to be enabled or disabled in operation 610. For example, the second user interface may be provided as a shortcut.

For example, the second user interface may be provided as an icon to execute a screen for controlling the operation of the multi-feed detection sensor 220 on a main screen provided by the user interface device 240. Based on an input for selecting the icon being received, the image forming apparatus 10 may display a screen for setting the multi-feed detection sensor 220 to be enabled or disabled.

For example, the second user interface may be provided as an icon selectable in two modes of an on state or an off state of the multi-feed detection function. For example, based on the icon being in the on state, the multi-feed detection sensor 220 may be enabled. Based on the icon being in the off state, the multi-feed detection sensor 220 may be disabled.

In operation 620, the image forming apparatus 10 may receive second setting information through the second user interface. For example, the user interface device 240 may receive, through the second user interface, the second setting information to set the multi-feed detection function to be enabled or disabled.

In operation 630, the image forming apparatus 10 may control the operation of the multi-feed detection sensor 220 with respect to an input job based on the second setting information.

For example, based on the second setting information including information to enable the multi-feed detection function, the multi-feed detection sensor 220 may be enabled. For example, based on the scan job being performed by the scanner 210, the multi-feed detection sensor 220 may monitor whether an event corresponding to the multi-feed of a paper fed from a feeding device occurs. Based on the event corresponding to the multi-feed of the paper being detected, the return device 230 may return the target paper detected as the event.

For example, based on the second setting information including information to disable the multi-feed detection function, the multi-feed detection sensor 220 may be disabled. For example, based on the scan job being performed by the scanner 210, since the multi-feed detection sensor 220 is disabled, the event corresponding to the multi-feed is not detected, and the scan job may be completed.

For example, the multi-feed detection function may be performed one-time according to the second setting information input from the second user interface. Accordingly, based on a job requested by the user being completed, a state of the multi-feed detection function may be a state of the multi-feed detection function before the second setting information is input.

For example, in a case where the second setting information includes information to enable the multi-feed detection function, based on an input job being performed, the multi-feed detection sensor 220 may monitor whether the event corresponding to the multi-feed of the paper fed from the feeding device occurs. Based on the input job being completed, the multi-feed detection function may be set to the state before the second setting information is input.

For example, before the second setting information is input, the multi-feed detection function may be in an enabled state. In a case where the second setting information includes information to disable the multi-feed detection function, based on the input job being performed, the multi-feed detection sensor 220 may be disabled, and a return function of the return device 230 to return the target paper may also be disabled, Based on the input job being performed, the multi-feed detection function may be changed to an enabled state before the second setting information is input. Accordingly, based on the event corresponding to the multi-feed occurring after the input job is completed, the return device 230 may return the target paper detected as the event.

Figure 7:
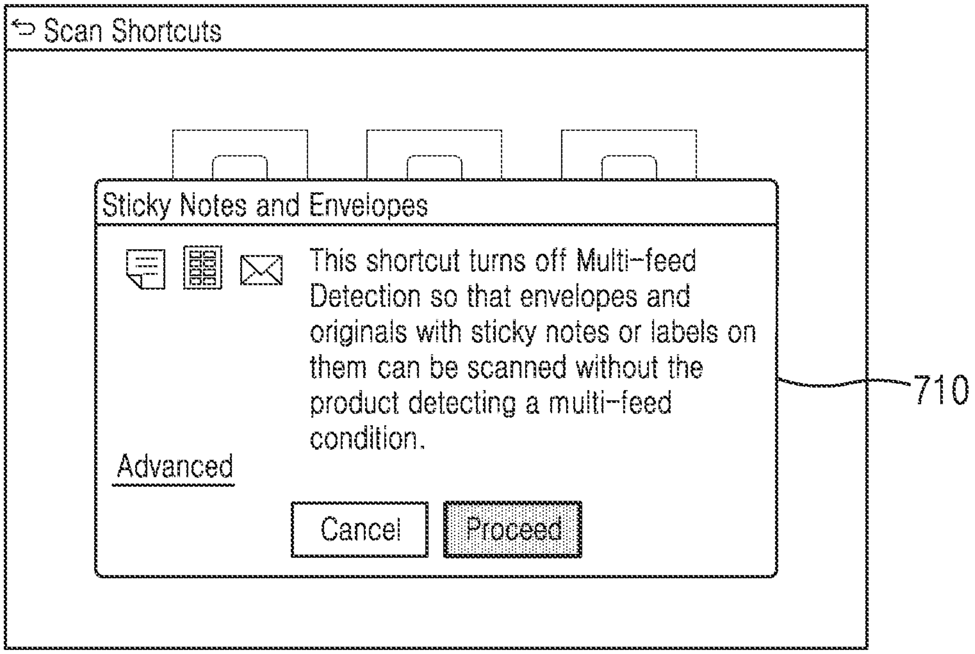
FIG. 7 is a diagram illustrating a user interface to set a multi-feed detection function according to an example.

FIG. 7 is a diagram illustrating a user interface to set a multi-feed detection function according to an example.

For example, the image forming apparatus 10 may display a shortcut for setting the multi-feed detection function. For example, based on an input for selecting the shortcut being received, a screen to set the multi-feed detection function may be displayed. That is, as the input for selecting the shortcut is received, the image forming apparatus 10 may display the screen to set the multi-feed detection function without going through a plurality of settings. By providing the shortcut for setting the multi-feed detection function, the user may easily set the multi-feed detection function. In addition, the multi-feed detection function set according to the setting information input through the shortcut may be applied to the job requested by the user, and, based on the requested job being completed, may be set to the previous state of the multi-feed detection function. For example, the previous state of the multi-feed detection function may be the state of the multi-feed detection function before the setting information is input through the shortcut. The setting information input through the shortcut may be temporarily applied to setting of the multi-feed detection function.

For example, based on the multi-feed detection function being enabled before the setting information is input through the shortcut, and the information input through the shortcut including information to disable the multi-feed detection function, the multi-feed detection sensor 220 may be disabled with respect to the job input by the user, and a return function of the return device 230 to return the target paper may also be disabled. Thereafter, based on the job input by the user being completed, the multi-feed detection sensor 220 may be enabled, and the return function of the return device 230 to return the target paper may also be enabled. That is, based on the job input by the user being completed, and an event corresponding to the multi-feed occurring, the return device 230 may return the target paper detected as the event.

Referring to FIG. 7, the image forming apparatus 10 may display a message 710 informing that the multi-feed detection function is disabled so that the scan job may be performed without detecting the multi-feed. For example, based on an input for selecting a "proceed" icon being received, the image forming apparatus 10 may disable the multi-feed detection sensor 220. For example, based on an input for selecting a "cancel" icon being received, the image forming apparatus 10 may enable the multi-feed detection sensor 220.

For example, the shortcut for setting the multi-feed detection function may be displayed on a main screen provided by the image forming apparatus 10. Using the shortcut, the image forming apparatus 10 may quickly execute a setting screen for setting the multi-feed detection function.

For example, as the input for selecting the shortcut is received, the image forming apparatus 10 may enable or disable the multi-feed detection function. For example, based on the shortcut being in an on state, the multi-feed detection function may be performed in an enabled state, and, based on the shortcut being in an off state, the multi-feed detection function may be performed in a disabled state.

For example, based on the input for selecting the shortcut being received while the shortcut icon is in the on state, the image forming apparatus 10 may switch the shortcut from the on state to the off state, and disable the multi-feed detection function. Also, the image forming apparatus 10 may disable a function of the return device 230 to return the target paper with respect to the job input by the user. Thereafter, based on the job input by the user being completed, the image forming apparatus 10 may switch the shortcut from the off state to the on state, and enable the multi-feed detection function. Also, the image forming apparatus 10 may enable the function of the return device 230 to return the target paper. Thereafter, based on the event corresponding to the multi-feed occurring, the return device 230 may return the target paper detected as the event.

For example, based on the input for selecting the shortcut being received while the shortcut icon is in the off state, the image forming apparatus 10 may switch the shortcut from the off state to the on state, and enable the multi-feed detection function. Also, the image forming apparatus 10 may enable the function of the return device 230 to return the target paper with respect to the job input by the user. Thereafter, based on the job input by the user being completed, the image forming apparatus 10 may switch the shortcut from the on state to the off state, and disable the multi-feed detection function. Also, the image forming apparatus 10 may disable the function of the return device 230 to return the target paper. That is, based on the job input by the user being completed, the image forming apparatus 10 may disable the multi-feed detection sensor 220 and control the operation of the return device 230 so that the target paper is not returned.

Figure 8:
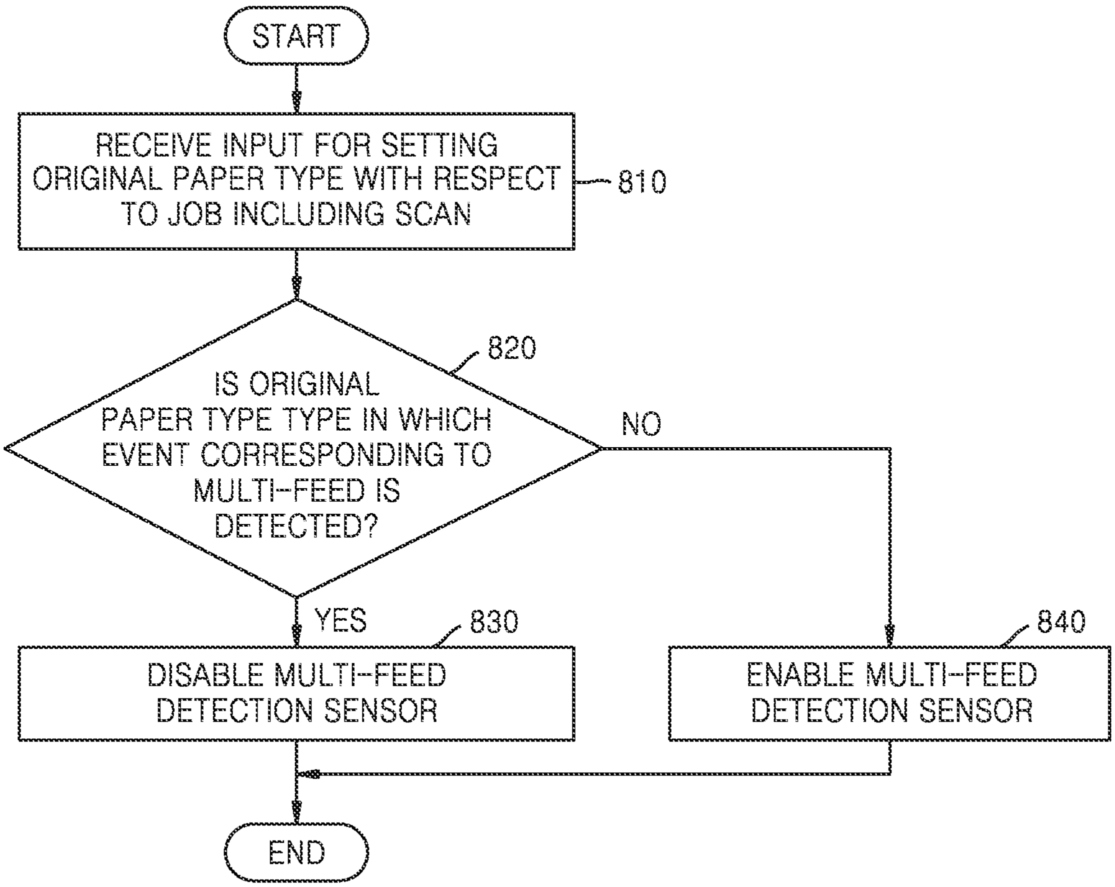
FIG. 8 is a flowchart illustrating an operating method of an image forming apparatus to control an operation of a multi-feed detection sensor according to a setting of an original paper type with respect to a job including performing a scan according to an example.

FIG. 8 is a flowchart illustrating an operating method of an image forming apparatus to control an operation of a multi-feed detection sensor according to a setting of an original paper type with respect to a job including performing a scan according to an example.

Referring to FIG. 8, the image forming apparatus 10 may receive an input for setting the original paper type with respect to the job including performing a scan in operation 810. For example, the job including performing a scan may be the scan job, a scan-to-email job, a scan-to-share job, a scan-to-fax job, a copy job, etc. The job including performing a scan may refer to a case in which the scan job is included in the job.

For example, the original paper may refer to a paper that is the original for the job including performing the scan. In addition, the original paper may be distinguished from a copy paper output as the job including performing the scan. Also, setting for the original paper and setting for the copy paper may be set differently.

For example, the original paper type may be set to one of plain paper, thick paper, thin paper, label paper, envelope, thick envelope, cotton paper, card paper, stapled paper, etc.

In operation 820, the image forming apparatus 10 may confirm whether the original paper type is a type in which the event corresponding to the multi-feed is detected.

For example, based on the original paper type being the type in which the event corresponding to the multi-feed is detected, the image forming apparatus 10 may disable the multi-feed detection sensor 220 in operation 830. For example, based on the original paper type being set to envelope, the image forming apparatus 10 may disable the multi-feed detection sensor 220.

For example, based on the original paper type not being the type in which the event corresponding to the multi-feed is detected, the image forming apparatus 10 may enable the multi-feed detection sensor 220 in operation 840.

Figure 9:
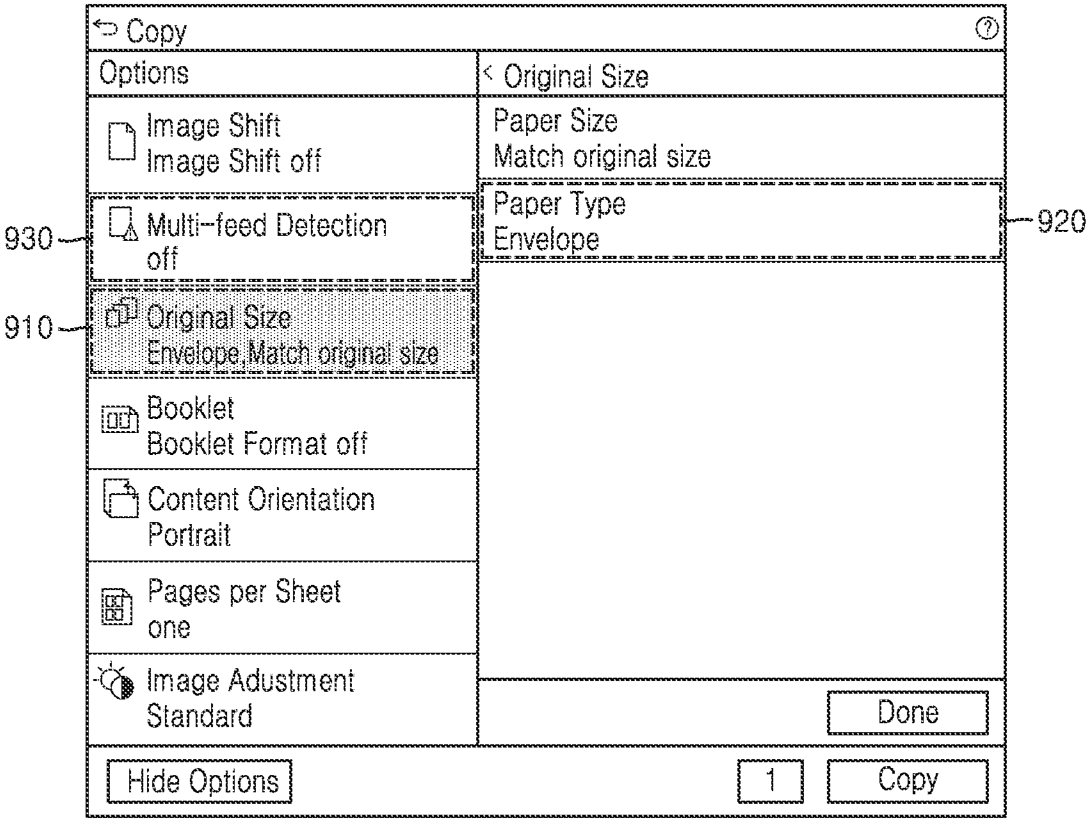
FIG. 9 is a diagram illustrating a user interface to set an original paper type according to an example.

FIG. 9 is a diagram illustrating a user interface to set an original paper type according to an example.

For example, the image forming apparatus 10 may provide the menu 910 to set an original paper size. Based on the menu 910 to set the original paper size being selected, the image forming apparatus 10 may provide the menu 910 to set the original paper size and the menu 920 to set the original paper type.

For example, based on an input for selecting the menu 920 to set the original paper type being received, the image forming apparatus 10 may display a list of original paper types. For example, the list of original paper types may include plain paper, thick paper, thin paper, label paper, envelope, thick envelope, cotton paper, card paper, stapled paper, etc. For example, the original paper types in the list may be classified according to thicknesses of original papers.

For example, based on an original paper type selected from the list being included in preset original paper types, the image forming apparatus 10 may disable a multi-feed detection function. For example, the preset original paper types may correspond to papers whose thicknesses exceed a preset reference value. For example, the preset original paper types may include envelope, thick paper, thick envelope, cotton paper, card paper, stapled paper, etc.

Referring to FIG. 9, based on the original paper type being set to envelope, the image forming apparatus 10 may automatically switch the multi-feed detection function from an on state to an off state in the menu 930 to set the multi-feed detection function. That is, according to the original paper type set in the menu 920, an enabled state or a disabled state of the multi-feed detection function may be automatically set.

Figure 10:
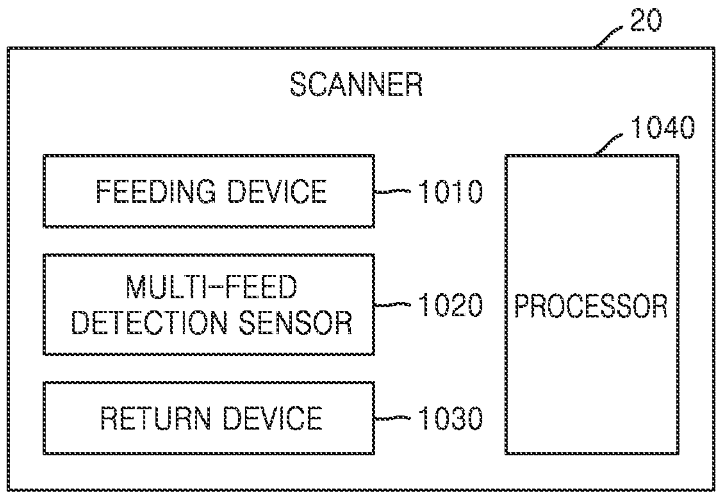
FIG. 10 is a block diagram illustrating a scanner according to an example.

FIG. 10 is a block diagram of a scanner according to an example.

Referring to FIG. 10, a scanner 20 may include a feeding device 1010, a multi-feed detection sensor 1020, a return device 1030, and a processor 1040. However, the scanner 20 may be implemented by more or fewer elements than the elements illustrated in FIG. 10. Hereinafter, examples of the elements will be described.

For example, an operation of the feeding device 1010 illustrated in FIG. 10 may correspond to an operation of a feeding device of the scanner 210 illustrated in FIG. 2. In addition, the operation of the multi-feed detection sensor 1020 shown in FIG. 10 may correspond to an operation of the multi-feed detection sensor 220 shown in FIG. 2. Also, an operation of the return device 1030 illustrated in FIG. 10 may correspond to an operation of the return device 230 illustrated in FIG. 2. Also, an operation of the processor 1040 illustrated in FIG. 10 may correspond to an operation of the processor 260 illustrated in FIG. 2.

The feeding device 1010 may feed papers loaded on the feeding device 1010 one by one according to a request for a scan job. The multi-feed detection sensor 1020 may detect an event corresponding to a multi-feed of the paper fed from the feeding device 1010. The return device 1030 may return a target paper detected as the event corresponding to the multi-feed.

The processor 1040 may control an operation of the scanner 20 and include at least one processor such as a CPU. The processor 1040 may include at least one processor specialized for each function or may be an integrated processor.

For example, the processor 1040 may obtain setting information of the multi-feed detection sensor 1020. The processor 1040 may set whether to enable the multi-feed detection sensor 1020 based on the setting information.

For example, based on the setting information including information to enable the multi-feed detection function, the processor 1040 may enable the multi-feed detection sensor 1020. On the other hand, based on the setting information including information to disable the multi-feed detection function, the processor 1040 may disable the multi-feed detection sensor 1020.

The processor 1040 may control an operation of the return device 1030 to return the target paper detected as the event, based on whether to enable the multi-feed detection sensor 1020.

For example, based on the state of the multi-feed detection sensor 1020 being an enabled state, the multi-feed detection sensor 1020 may detect the event corresponding to the multi-feed, Based on the event corresponding to the multi-feed being detected, the processor 1040 may control the operation of the return device 1030 so that the target paper detected as the event is returned.

For example, based on the state of the multi-feed detection sensor 1020 being a disabled state, the paper to be detected as the event corresponding to the multi-feed may not be detected as the target paper. The processor 1040 may complete the scan job according to the request for the scan job.

Figure 11:
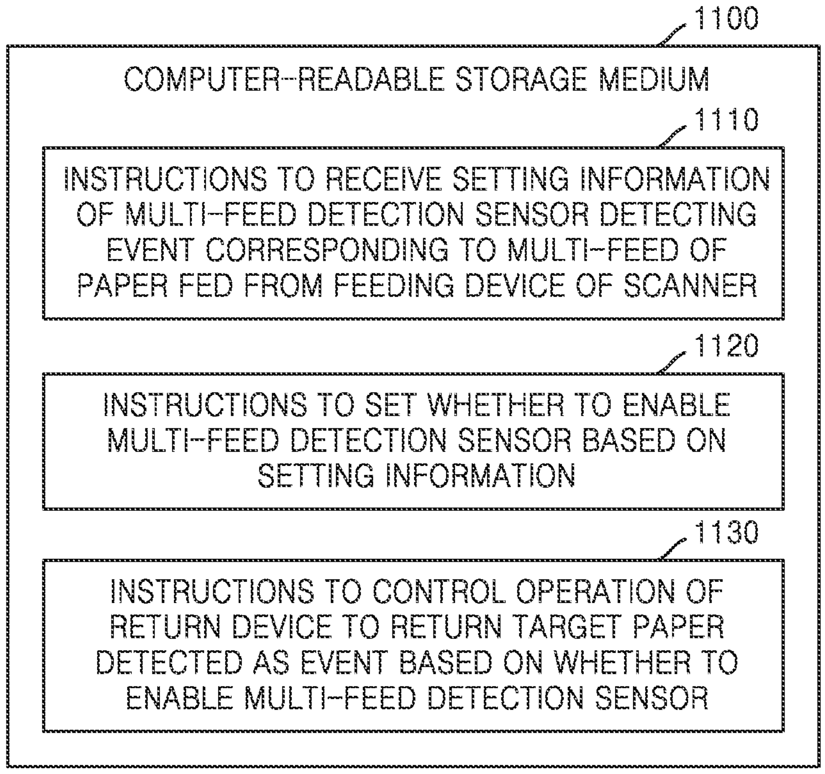
FIG. 11 is a diagram illustrating instructions stored in a non-transitory computer-readable storage medium according to an example.

FIG. 11 is a diagram illustrating instructions stored in a non-transitory computer-readable storage medium according to an example.

A non-transitory computer-readable storage medium 1100 may store instructions related to example operations of the image forming apparatus 10 described with reference to FIGS. 1 to 9. For example, the non-transitory computer-readable storage medium 1100 may store instructions with respect to an example operating method of an image forming apparatus that controls an operation of a return device based on setting information of a multi-feed detection sensor.

For example, the non-transitory computer-readable storage medium 1100 may store instructions 1110 to receive setting information of a multi-feed detection sensor detecting an event corresponding to a multi-feed of a paper fed from a feeding device of a scanner, instructions 1120 to set whether to enable the multi-feed detection sensor based on the setting information, and instructions 1130 to control the operation of the return device to return a target paper detected as the event based on whether to enable the multi-feed detection sensor.

As described above, examples of the operating method of the image forming apparatus 10 described above may be implemented in the form of a non-transitory computer-readable storage medium that stores instructions or data executable by a computer or processor. The example operating method of the image forming apparatus 10 described above may be written as a program that may be executed on a computer, and may be implemented in a general-purpose digital computer that operates such a program using a non-transitory computer-readable storage medium. Such non-transitory computer-readable storage medium may be any device capable of storing data such as read-only memory (ROM), random-access memory (RAM), flash memory, CD-ROMs, CD-Rs, CD+Rs, CD-RWs, CD+RWs, and DVD-ROMs, DVD-Rs, DVD+Rs, DVD-RWs, DVD+RWs, DVD-RAMs, BD-ROMs, BD-Rs, BD-R LTHs, BD-Res, magnetic tapes, floppy disks, magneto-optical data storage devices, a hard disk, a solid-state disk (SSD), machine readable instructions, associated data, data files, and data structures, and providing machine readable instructions, associated data, data files, and data structures to a computer such that the processor or the computer may execute an instruction.

Although examples have been described with reference to the accompanying drawings, various changes and modifications may be made therein. For example, the relevant results may be achieved even based on the described technologies being performed in a different order than the described methods, and/or even based on the described elements such as systems, structures, devices, and circuits being coupled or combined in a different form than the described methods or are replaced or substituted by other elements or equivalents.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming apparatus comprising:

a scanner comprising a feeding device;

a multi-feed detection sensor to detect an event corresponding to a multi-feed of a paper fed from the feeding device:

a return device to return a target paper detected as the event;

a user interface device;

a processor; and a memory to store instructions executable by the processor, wherein the processor is to execute the instructions to:

in response to setting information of the multi-feed detection sensor input through the user interface device including information to enable a multi-feed detection function, enable the multi-feed detection sensor, and control an operation of the return device so that the target paper is returned, and in response to the setting information including information to disable the multi-feed detection function, disable the multi-feed detection sensor, and control the operation of the return device so that the target paper is not returned.

2. The image forming apparatus of claim 1, wherein the processor is to execute the instructions to:

in response to the event being detected according to a scan job performed by the scanner, display a first user interface to set the multi-feed detection function through the user interface device, and control an operation of the multi-feed detection sensor based on first setting information input through the first user interface.

3. The image forming apparatus of claim 2, wherein the processor is to execute the instructions to, in response to the first setting information including the information to enable the multi-feed detection function, enable the multi-feed detection sensor, and display first guide information to prevent a multi-feed of the target paper through the user interface device.

4. The image forming apparatus of claim 2, wherein the processor is to execute the instructions to, in response to the first setting information including the information to disable the multi-feed detection function, disable the multi-feed detection sensor, and retry the scan job.

5. The image forming apparatus of claim 4, wherein the processor is to execute the instructions to display second guide information to retry the scan job through the user interface device.

6. The image forming apparatus of claim 1, wherein the processor is to execute the instructions to:

display a second user interface to set the multi-feed detection function to be enabled or disabled through the user interface device, and control an operation of the multi-feed detection sensor with respect to an input job based on second setting information input through the second user interface.

7. The image forming apparatus of claim 1, wherein the processor is to execute the instructions to:

receive an input for setting an original paper type with respect to a job including performing a scan through the user interface device, and in response to the original paper type being a type in which the event corresponding to the multi-feed is detected by the multi-feed detection sensor, disable the multi-feed detection sensor.

8. The image forming apparatus of claim 1, wherein the multi-feed detection sensor is to detect the event corresponding to the multi-feed in response to a thickness of the paper fed from the feeding device exceeding a preset reference value.

9. The image forming apparatus of claim 1, wherein the event corresponding to the multi-feed comprises at least one of an event in which multiple papers are fed at one time, an event in which a paper having a sticky note thereon is fed, an event in which a stapled paper is fed, or an event in which a paper having a thickness exceeding a preset reference value is fed.

10. A non-transitory computer-readable storage medium storing thereon instructions executable by a processor, the non-transitory computer-readable storage medium comprising:

instructions to receive setting information of a multi-feed detection sensor to detect an event corresponding to a multi-feed of a paper fed from a feeding device of a scanner;

instructions to set whether to enable the multi-feed detection sensor based on the setting information; and instructions to, in response to the setting information including information to enable a multi-feed detection function, enable the multi-feed detection sensor, and control an operation of a return device so that a target paper detected as the event is returned; and instructions to, in response to the setting information including information to disable the multi-feed detection function, disable the multi-feed detection sensor, and control the operation of the return device so that the target paper is not returned.

11. The non-transitory computer-readable storage medium of claim 10, wherein the instructions to receive the setting information of the multi-feed detection sensor comprise, in response to the event being detected according to a scan job, instructions to display a first user interface to set the multi-feed detection function, and wherein the instructions to set whether to enable the multi-feed detection sensor comprise instructions to control an operation of the multi-feed detection sensor based on first setting information input through the first user interface.

12. The non-transitory computer-readable storage medium of claim 10, wherein the instructions to receive the setting information of the multi-feed detection sensor further comprise instructions to display a second user interface to set the multi-feed detection function to be enabled or disabled, and wherein the instructions to set whether to enable the multi-feed detection sensor further comprise instructions to control an operation of the multi-feed detection sensor with respect to an input job based on second setting information input through the second user interface.

13. The non-transitory computer-readable storage medium of claim 10, wherein the instructions to receive the setting information of the multi-feed detection sensor further comprise instructions to receive an input for setting an original paper type with respect to a job comprising scan, and wherein the instructions to set whether to enable the multi-feed detection sensor further comprise instructions to disable the multi-feed detection sensor in a case where the original paper type is a type in which the event corresponding to the multi-feed is detected by the multi-feed detection sensor.

14. A scanner comprising:

a feeding device;

a multi-feed detection sensor to detect an event corresponding to a multi-feed of a paper fed from the feeding device:

a return device to return a target paper detected as the event; and a processor to:

in response to setting information of the multi-feed detection sensor including information to enable a multi-feed detection function, enable the multi-feed detection sensor, and control an operation of the return device so that the target paper is returned, and in response to the setting information including information to disable the multi-feed detection function, disable the multi-feed detection sensor, and control the operation of the return device so that the target paper is not returned.

* * * * *